May 15, 1923.

J. G. REED

DEMOUNTABLE RIM

Filed Nov. 30, 1921

1,455,733

Patented May 15, 1923.

1,455,733

UNITED STATES PATENT OFFICE.

JOHN G. REED, OF ORWIGSBURG, PENNSYLVANIA.

DEMOUNTABLE RIM.

Application filed November 30, 1921. Serial No. 518,869.

*To all whom it may concern:*

Be it known that I, JOHN G. REED, a citizen of the United States, and a resident of Orwigsburg, in the county of Schuylkill and State of Pennsylvania, have invented a new and Improved Demountable Rim, of which the following is a full, clear, and exact description.

This invention relates to improvements in demountable rims, the principal object of the invention being to provide a rim of this character which will facilitate and expedite the removal and replacement of a tire.

A further object is to provide a demountable rim, which will be exceedingly simple and practical in construction and operation, which will be strong, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 1 is a view in longitudinal section through my improved rim;

Figure 2 is a view in elevation showing the same partially assembled;

Figure 3 is a view in side elevation of the detachable flange member;

Figure 4 is a view in transverse section on the line 4—4 of Figure 1;

Figure 5 is a similar view on the line 5—5 of Figure 1;

Figure 6 is a fragmentary inside plan view of the rim; and

Figure 7 is a fragmentary inside plan view showing the details of the locking mechanism.

Referring in detail to the drawings, it will be seen that my improved rim comprises an annular base or body portion 1, which is split in the usual manner, as indicated at 2, and which is provided throughout its length with an annular tire holding flange 3 at one edge. The two adjacent ends of the split rim may be locked together in a conventional manner, as for instance, by a block 4 carried by one end of the rim, which includes a lug 5 fitting within an opening 6 in the adjacent end of the rim. The lug may be positively locked by turning a screw 7 having a segmental head 8, which may be moved to selectively engage or release a shoulder 9 on the block 4. This manner of securing the ends of the rim together is conventional and forms no part of this invention.

My invention has to do with means for facilitating the removal of a tire from the rim. It has already been noted that the base or body 1 of the rim is formed with one integral annular flange 3. An opposed co-acting flange 10 is integral with the opposite edge of the base of the rim adjacent the split. This flange, however, is relatively short and is supplemented by the provision of a removable or detachable flange carrying member 11, illustrated in Figure 3. This member includes a flat arcuate portion 12 fitting within the rim member 1 and overlying the inner face of this member. Integral with the arcuate member 11 is a flange 13 which supplements the flange 10.

I prefer to secure the member 11 to the member 1 by the use of a novel form of securing device, indicated at 14. It will be noted that the flat portion 12 of the arcuate member 11 is provided at intervals with openings 15 for the reception of these securing devices, which are turnably mounted within the base 1 of the rim, as indicated at 15'. It will also be noted that the openings 15 in the arcuate member have tapered walls 16 and that the openings themselves are relatively long, as seen most clearly in Figure 6. The heads of the securing devices 14 are of long narrow shape and are formed with grooves 17 for the reception of a screw driver or other tool to turn the same. The arcuate member 11 may be selectively attached to or removed from the member 1 by giving a half turn to the securing devices. This will either permit the passage of the heads of the devices through the openings 15 or serve to turn the same crosswise to the openings so that they are held against the tapered walls 16 of the openings. I also prefer to use other securing devices 18 carried by the member 1 and engageable with the beveled ends 19 of the removable member 11 for holding the same against contraction.

The operation of the device is as follows: When it becomes desirable to remove a tire from a rim, it is merely necessary to release the securing devices 14 and 18 and detach the flange carrying member 11, after which the tire may be very readily and easily removed. In placing on the rim, the adjacent ends of the rim are first locked together, the tire placed on the rim, where it will be held by the flanges 3 and 10, and the detachable member 11 again inserted to supplement the flange 10 and positively hold the tire in place. With the cord tires at present in use, the stiffness of the tire makes it almost impossible to remove the same from a rim, but my invention entirely obviates this difficulty.

The usual opening 20 is formed in the base 1 of the rim for the accommodation of a tire valve stem.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a demountable rim, the combination with a split base ring provided with tire flanges, one of said flanges being cut away throughout the major portion of its length, of a detachable member secured to said ring, a supplemental flange carried thereby forming a continuation of said broken away flange, said detachable member comprising an arcuate strip secured to the inner face of the ring, and provided with openings, and securing devices mounted to rotate in said ring, movable through said openings and selectively engageable with said arcuate member to secure the supplemental flange against transverse and circumferential movement.

2. A demountable rim, including a split base ring having one complete tire flange and a portion of the opposite flange, a supplemental flange section cooperating with said portion to complete the same, said supplemental flange detachably associated with said ring, means for positively locking said flange against movement in any direction, said means including an arcuate strip integral with the supplemental flange section and overlying the inner face of the ring, said strip having openings therein, and securing devices rotatably mounted in the ring passed through said openings and turnable to lock said strip against the ring.

JOHN G. REED.